April 26, 1960 J. L. HOGAN Re. 24,817

INVALID WALKER

Original Filed April 13, 1954 2 Sheets-Sheet 1

Joseph L. Hogan

INVENTOR.

BY Thomas A. O'Brien and Harvey B. Jackson Attorneys

April 26, 1960 J. L. HOGAN Re. 24,817

INVALID WALKER

Original Filed April 13, 1954 2 Sheets-Sheet 2

Joseph L. Hogan
INVENTOR.

BY Clarence A. O'Brien and Harvey B. Jacobson
Attorneys

United States Patent Office

Re. 24,817
Reissued Apr. 26, 1960

24,817

INVALID WALKER

Joseph L. Hogan, San Francisco, Calif., assignor to Walk-A-Lator Mfg. Co., Inc., Santa Rosa, Calif., a corporation of California Original No. 2,745,465, dated May 15, 1956, Serial No. 422,785, April 13, 1954. Application for reissue May 9, 1958, Serial No. 735,349

5 Claims. (Cl. 155—23)

Matter enclosed in heavy brackets [ ] appears in the original patent but forms no part of this reissue specification; matter printed in italics indicates the additions made by reissue.

This invention relates to an invalid walker and more particularly to a device for assisting crippled persons, people suffering from polio and other kindred infirmities in the art of walking.

*In the rehabilitation of children and adults who have suffered disabilities resulting in the loss of the use of their legs, the process of learning to walk again is extremely slow and painful. For a considerable period of time, the patient does not have any power or strength to raise his feet as in normal walking.*

*To aid the patient in learning to walk again, many walker devices have been developed. Such are designed to allow the patient to use his arms and hands to control his body movements. To this end, such devices are arranged in the form of rigid body frames on which the patient can place his hands for supporting his weight. Such a device is designed to be moved by the patient leaning on the device in such a manner that his weight moves it forward.*

*For a considerable period of time, all forward motion with this type of walker is characterized by a shuffling action. Initially the feet can be moved only a fraction of an inch at a time. Larger steps (in terms of inches) are taken as time progresses, until the patient gains strength in his legs.*

*In order that a patient will readily learn to walk, he must have complete freedom from fear of falling. In this connection, the degree of control he has over the walker device is largely determinative in advancing his recovery.*

*However, prior art walkers are not satisfactory for giving the patient the complete assurance of control that he needs. Most of these devices are constructed with side rails having substantially vertical legs, with wheels at the lower ends of the rear and/or front legs. Due to their form of construction, either too little or too much force is required to move the device along the walking surface, depending on whether wheels are located at both ends or only the front end of the device.*

*Another form of walker device in the prior art has force receiving members extending upwardly from front wheels, wherein the patient leans on handles at the upper ends of such members. This device presents a serious problem of control because it is too likely to tilt under the patients weight.*

*There are various modifications of the above-mentioned types of walkers, in which extensions are provided for armpit rests, to support a patient's weight at the armpits. One such device, for example, has braces extending at an angle from the armpit rests to side bars on a rectangular frame having front wheels and a rear caster wheel, the forward ones of the braces intermediate their ends being provided with hand grips. Such a device has*

*the same disadvantage of tilting when using it as a walker and alone, as the device previously described. In addition, there is no control whatever over the direction of movement; furthermore, the portions of the braces extending above the hand grips confine the upper portion of the patient's body therebetween, thereby restricting his freedom of action.*

*Thus, prior art walker devices are objectionable because they require too much or too little force to effect their movement, or they inhibit body freedom, or they are too likely to tilt, or it is too difficult to control their direction of movement. All of these factors serve to create fear of falling, and there is no walker device which eliminates all of these objections.*

*It is, therefore, a primary object of this invention to provide an improved walker device which eliminates all the above described disadvantages.*

An object of this invention is to provide an invalid walker upon which a person may lean while attempting to walk.

Another object of this invention is to provide a walker which can be used by babies when learning to walk.

A further object of this invention is to provide an invalid walker having means thereon to prevent the walker from sliding sideways thereby giving greater confidence to the person using the same.

Yet a further object of this invention is to provide an invalid walker wherein the center of gravity is disposed within the confines of the frame to prevent the possibility of slipping and give a sense of security to the user.

A still further object of this invention is to provide an improved invalid [rocker] *walker* having a seat mounted thereon upon which the invalid may rest when desired.

Another object of this invention is to provide an invalid walker having a pair of armpit supporting members mounted thereon for giving greater support to the user.

A still further object of this invention is to provide an invalid walker which is simple and efficient in construction, and durable and lasting in use.

These together with other objects and advantages [and] *which* will become subsequently apparent reside in the details of construction and operation as more fully hereinafter described and claimed, reference being had to the accompanying drawings forming a part hereof, wherein like numerals refer to like parts throughout, and in which:

Referring now more particularly to the accompanying drawings, it will be seen that the improved invalid walker forming the subject of this invention includes a frame formed of a pair of side members each of which is provided with a horizontal portion 10 having a substantially vertically extending portion 12 secured to the forward end thereof. The vertical portion 12 extends rearwardly of the horizontal portion 10 and is also provided with a portion thereof offset inwardly toward the other side frame member.

Figure 6:
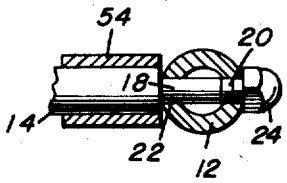
Figure 6 is a sectional view taken substantially along the section line 6—6 of Figure 2.

A pair of parallel shafts 14 and 16 extend between the side frame members. The shaft 14 extends between the upper ends of the vertical portion 12 and the shaft 16 extends between the lower ends of the vertical portion 12. As seen in Figure 6, the side frame members formed on the portions 10 and 12 are preferably tubular in cross-section and the shafts 14 and 16 are provided with reduced ends 18 which are externally threaded as at 20. The portions 12 are provided with aperatures 22 extending therethrough which receive the reduced ends 18 of the shafts 14 and 16. Suitable cap nuts 24 are engaged on the threaded portions 20 for retaining the shafts 14 and 16 in position on the side frame members. By providing the reduced end portions 18 the side frame members will be prevented against movement toward each other along the shafts 14 and 16.

A pair of wheels 26 are rotatably mounted on the shaft 16. One of the wheels 26 is positioned adjacent each end of the shaft 16. Suitable collars 28 are fixedly mounted on the shaft 16 to prevent the wheels 26 from moving longitudinally of the shaft 16.

The upper ends of the portions 12 are provided with horizontally disposed rearwardly extending portions 30. Each of these portions 30 is provided with a handgrip 32 whereby the user of the device may conveniently grip the same. A suitable brace member 34 extends between the forward ends of the horizontally disposed portions 30 and the rear end of the horizontally disposed portion 10. The rear end of the horizontal portion 10 is provided with a downwardly extending portion 36 having a suitable snubber 38 at its lower end.

In practical use of the device thus far described, an invalid or the like will grasp the hand-grip 32 for steadying himself during an attempt at walking. By slightly raising the rear end of the horizontal portion 10 he may push the device forwardly on the wheels 26.

In order that the user may move the device forwardly without raising the rear end of the horizontal portion 10, a plate 40 is pivotally secured by means of a suitable fastener 42 to the rear end of each of the horizontal portions 10. A wheel 44 is pivotally secured by means of a fastener 46 to the plate 40. The plates 40 are further provided with a pair of apertures 48 extending therethrough. A spring-pressed plunger 50 of conventional construction is mounted on each of the horizontal portions 10 and is adapted to extend therethrough and into engagement with a selected one of the apertures 48. Thus, it will be seen that by placing the spring-pressed plunger 40 in engagement with a desired one of the apertures 48 the wheels 44 will be moved into and out of contact with the surface over which the device is traveling. When the wheels 44 are in contact with the surface the entire device may be freely moved over the surface by the user without the necessity of having to raise the rear end of the walker.

In order to provide an additional support for the user of the device, a pair of armpit supports are mounted on the walker. The armpit supports each comprises an L-shaped member 52 having a collar 54 secured to one end thereof. The collars 54 are adapted to be mounted on the shaft 14 whereby the members 52 can be pivoted between an upwardly extending position and a downwardly extending position. Secured to the other end of the members 52 are padded armpit rests 56. In order to maintain the armpit supports in an upwardly extending position a hook 58 is provided on [the legs thereof which is attached to the armpit rests 56 adjacent the connection of the other leg member thereto.] *each member 52 thereof. The armpit rests 56 are attached to the upper ends of the members 52.* The hooks 58 are adapted to engage the portions 30 which are secured to the side frame members.

The walker forming the subject of this invention is further provided with a seat whereby the user can rest when desired. This seat comprises a seat portion 60 having a leg 62 extending downwardly from each end thereof. The legs 62 are provided with an outwardly extending portion 64 at the lower end thereof. The horizontal portion 10 is provided with a plurality of apertures 66 adjacent its midportion for the reception of the outwardly extending portion 64 on the leg 62. The provision of a plurality of apertures 66 allows [the seat] *seats of different widths* to be [adjusted for] *placed on the walker to support* various size persons. The seat 60 is further provided with a rod 68 having portions thereof extending from opposite sides of the seat 60. Brackets 70 are mounted on the braces 34 midway of their length for receiving the end portions of the rod 68. These brackets 70 will thus retain the seat 60 in a substantially horizontal position whereby the user of the walker may sit on the same.

In order that the user may carry desired articles with him when he is using the device, there is provided for attachment to the shaft 14 a carrying basket 72. The basket 72 is provided with a pair of downwardly extending hooks 74 secured to the upper end of the rear side thereof. The hooks 74 are adapted to be engaged on the shaft 14 for retaining the basket 72 in position thereon.

Figure 1:
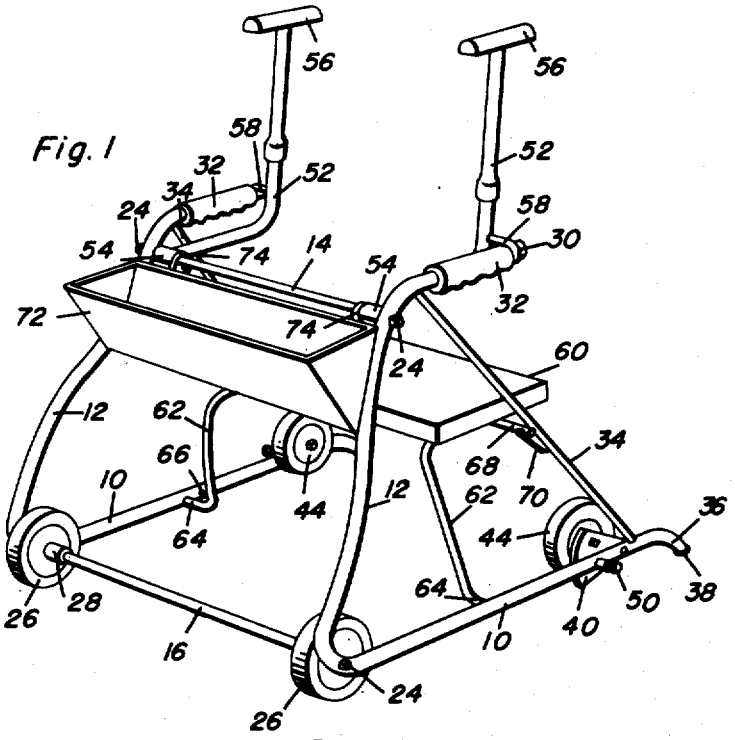
Figure 1 is a perspective view of the invalid walker forming the subject of this invention carrying the seat, armpit supporting members and carrying basket in operative position thereon.
Figure 4:
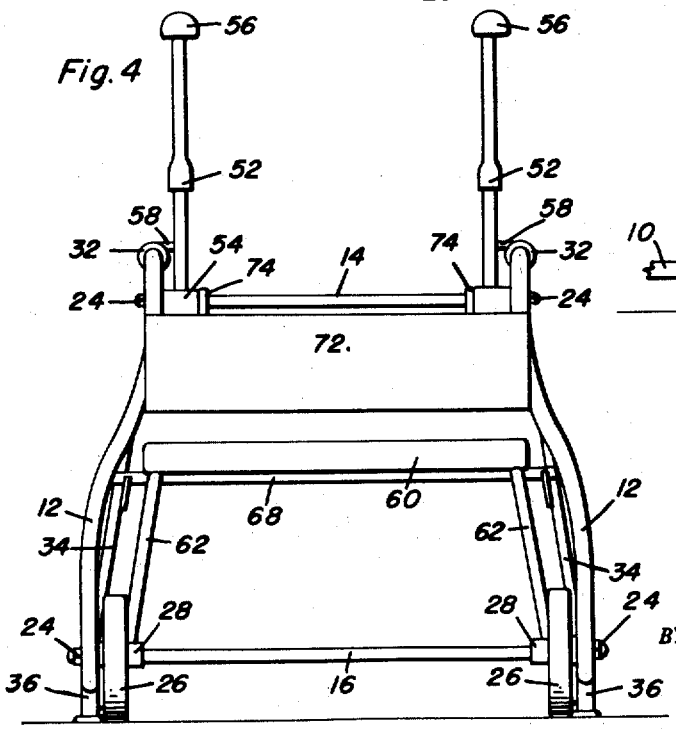
Figure 4 is a front end elevational view of the invalid walker showing the seat, armpit supporting members and carrying basket in operative position.
Figure 5:
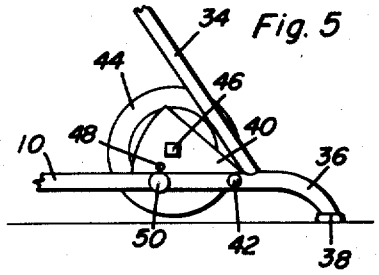
Figure 5 is a side elevational view of the rear portion of one of the frame members showing an auxiliary wheel in an inoperative position.
Figure 2:
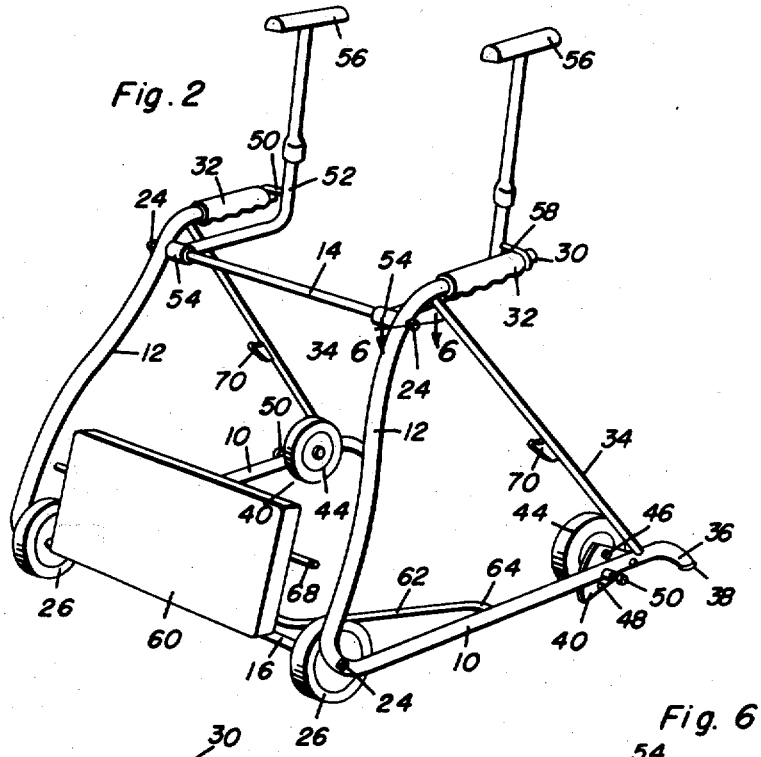
Figure 2 is a perspective view of the invalid walker similar to Figure 1 wherein the seat is moved to an inoperative position and the armpit supporting members are in an operative position.
Figure 3:
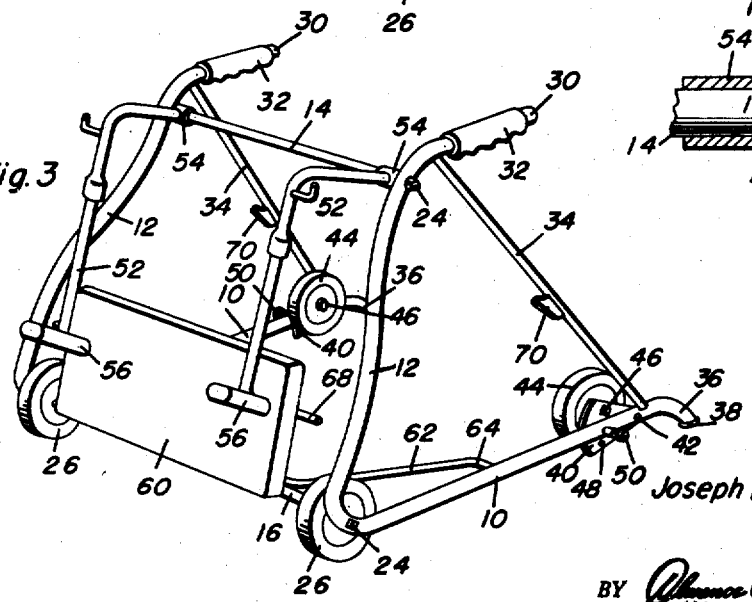
Figure 3 is a perspective view of the invalid walker wherein both the seat and the armpit supporting arms are in an inoperative position.

In practical use of the device, the seat 60 and armpit supporting member 50 can be left mounted on the frame at an inoperative position. This position is shown in Figure 3 of the drawings. In such a position the user of the device can have the wheels 44 either in ground-engaging position or in retracted position depending upon his desires at the time. Then, when he desires to rest the seat 60 can be moved to the position shown in Figure 1 and the person can then seat himself thereon. If, it is desired to add additional supports for the user the armpit supporting members 52 may be moved to the position shown in Figure 2 whereby the user will stand with the members 56 placed under his arms.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. An invalid walker comprising a frame, said frame being formed of a pair of side members, each of said side members having a horizontally disposed portion and a vertically extending portion secured to the forward end of said horizontal portion and extending upwardly and rearwardly therefrom, means extending between said side members for maintaining the same in vertical positions, said vertical portions being provided with horizontally disposed rearwardly extending handle portions, and a pair of wheels mounted for rotation on said frame adjacent the forward ends of said horizontal portions said means comprising a pair of parallel shafts extending between said side members one of said shafts being disposed adjacent the upper ends of said vertical portions the other of said shafts being disposed adjacent the lower ends of said vertical portions, said wheels being disposed at the opposite ends of said lower shaft, said side frame members being provided with a seat pivotally secured thereto for movement between an operative and an inoperative position, said seat comprising a seat portion provided with a leg extending downwardly from each end thereof, said legs being pivoted at their lower ends to said horizontal portions intermediate the length thereof, brace means connecting the upper ends of the vertical portions with the rear ends of the horizontal portions, said seat portion being provided with means thereon engaging said brace means for retaining said seat in an operative position.

2. An invalid walker comprising a frame formed of a pair of side members each having a horizontal lower portion and a vertical portion secured to the forward end of the horizontal portion, said vertical portions being provided with horizontal rearwardly extending handle portions, means extending between said side members for maintaining the same vertical and including a shaft adjacent the lower ends of said vertical portions, ground wheels on said shaft, a seat between said side members comprising an elongated seat portion, and legs extending downwardly from the ends of the seat portion and having lower ends pivoted to said horizontal portions whereby said seat portion is swingable vertically between upper and lower positions, respectively, braces connecting the upper ends of the vertical portions with said horizontal portions, and means on said seat portion engaging said braces to retain the seat portion in its upper position.

*3. An invalid walker comprising: a pair of rigid tubular members which are generally V-shaped, said members being in parallel, spaced vertical planes, each having a corresponding leg disposed horizontally, the remaining leg of each member extending upwardly, the upper ends of said remaining legs terminating in respective horizontal handle portions for supporting a patient's weight, said upper ends and handle portions being intermediate the ends of said horizontal legs; a rod extending between and supporting said members adjacent the junctions of the legs thereof; a pair of wheels rotatably mounted on the ends of said rod, being adapted to roll parallel to the spaced vertical planes of said members; at least one rigid brace element extending between and secured to said other legs of said members; a respective snubber element of resilient material on the end of each horizontal leg for frictionally engaging the surface; and a brace element for each member connected between the horizontal leg adjacent its snubber and the upper leg adjacent the end thereof.*

*4. A walker device comprising: a pair of lengths of rigid, substantially parallel tubular elements, each tubular element having a curved portion between its ends so as to form a generally V-shaped member having straight legs, a shaft extending between said tubular elements and secured at its ends to said curved portions thereof, a pair of wheels rotatably mounted on said shaft adjacent said curved portions, one of the legs of each tubular element extending substantially horizontally from said curved portion, whereby the other leg extends upwardly from said curved portion, the ends of said horizontal legs being curved downwardly, a respective snubber element on the downwardly curved end of each horizontal leg for abutting a surface on which the wheels are placed, said snubber elements being made of resilient material for frictionally engaging the surface, said other legs being curved adjacent their upper ends to that the end portions thereof are substantially horizontal, a hand grip member attached to said horizontal end portions, a brace member secured at its ends to said other legs below said horizontal end portions and adjacent the curves in the upper ends of said legs, and a respective brace member for each tubular element secured at its ends to the legs thereof, said last-mentioned brace members being secured to the upper ends of said other legs in the curves therein and to the straight portions of said horizontal legs adjacent the downwardly curving ends thereof.*

*5. In a walker device: Two spaced pairs of side rail members supporting at their upper ends respective horizontal hand grips for supporting a patient's weight, one side rail member of each pair extending downwardly from one end of the associated hard grip to a respective end of a horizontal rod, a second rod secured at its ends to said one side rail member of each pair adjacent said hand grips, a pair of wheels rotatably supported on said horizontal rod adjacent the lower ends of said one side rail member of each pair, a pair of parallel rods extending horizontally from said horizontal rod, said parallel rods being curved downwardly at their opposite ends, a snubber element of resilient material affixed to said opposite ends of said parallel rods, and the other side rail members of each pair extending from said one end of the associated hand grips to said opposite ends of said parallel rods, the lower ends of said other side rail members being secured to said opposite ends of said parallel rods on the horizontal portions thereof adjacent the curves therein.*

References Cited in the file of this patent or the original patent

UNITED STATES PATENTS

| | | |
|---|---|---|
| 503,105 | Tingley | Aug. 8, 1893 |
| 1,286,298 | Halliburton | Dec. 3, 1918 |
| 1,307,058 | McGrath | June 17, 1919 |
| 2,224,246 | Ames | Dec. 10, 1940 |
| 2,282,689 | Ames | May 12, 1942 |
| 2,339,007 | Gahm | Jan. 11, 1944 |
| 2,369,040 | Grady | Feb. 6, 1945 |
| 2,446,518 | Arnold et al. | Aug. 10, 1948 |
| 2,478,795 | Whalen et al. | Aug. 9, 1949 |
| 2,500,588 | Vosseler et al. | Mar. 14, 1950 |
| 2,591,912 | Block | Apr. 8, 1952 |
| 2,792,874 | Sundberg | May 21, 1957 |

FOREIGN PATENTS

| | | |
|---|---|---|
| 135,040 | Great Britain | Nov. 20, 1919 |